June 13, 1967

L. G. COREY 3,325,657

CYCLING ON-OFF ELECTRONIC TIMING SYSTEM

Filed July 29, 1964

Inventor
Lawrence G. Corey
By his attorneys
Howson and Howson

Inventor
Lawrence G. Corey
By his attorneys
Howson and Howson

United States Patent Office 3,325,657
Patented June 13, 1967

3,325,657
CYCLING ON-OFF ELECTRONIC TIMING SYSTEM
Lawrence G. Corey, Rockville, Conn., assignor to The Arrow-Hart & Hegeman Electric Company, Hartford, Conn., a corporation of Connecticut
Filed July 29, 1964, Ser. No. 386,008
12 Claims. (Cl. 307—132)

This invention relates to on and off load circuits, and more particularly it relates to the automatic timing and repetition of the timing cycles therefor.

A principal object of the invention is to provide a novel system for controlling the cyclically repetitive on and off periods for an electric load supply, as well as accurately controlling the selectable duration of the on and off periods for each repeated cycle.

Another object is to provide an electronic repetitive cycle system for on and off load control for such devices as the cranking or starting units of combustion engines and the like, although in its broader aspects the invention is equally well applicable to loads which are to be supplied with electric power in repetitive on and off cycles and with the repetition rate of the cycles selectable independently of the duration of the individual cycles.

Another object is to provide an improved system employing solid state transducer devices for controlling on and off periods of a load device such as for the starting or cranking equipment of engines and the like.

A feature of the invention relates to an electrical timing system for controlling the on and off duty cycles of a repetitively energized load, wherein the load is to be subjected to a predetermined maximum number of such cycles, and wherein the said number of cycles is controlled independently of the respective durations of the individual on and off periods in each cycle.

Another feature is to provide an improved control system for devices which are to be supplied with electric power of relatively wide voltage ranges such for example as are encountered in the starting system of automotive devices employing a battery or power source which may be as low as 7 volts or as high as 28 volts D.C. According to this feature the system is capable of precision control both as to the duration of the on and off cycles independently of each other, and also effecting the shut down of the starting system after a predetermined number of repeated cycles and independently of the pre-selected duration of the on and off periods in each cycle.

Another feature relates to a novel timing circuit wherein a pre-selected number of repetitive on and off cycles can be achieved while enabling the duration of the on and off periods in each cycle to be readily predetermined and varied over a continuous range between minimum and maximum.

A further feature relates to a novel on and off cyclically repetitive load control system wherein only two timing units are required, one for the on period and one for the off period, and the system can be pre-set by a counter device controlled by the respective timers to shut the system off at the end of a predetermined number of on and off cycles.

A further feature relates to a novel voltage regulator of the solid state transducer kind.

A still further feature relates to the novel organization, arrangement and relative interconnection of parts which cooperate to provide an improved repetitive cycle load control system.

Other features and advantages will appear from the ensuing descriptions and the attached drawing.

In the drawing, which shows by way of example one preferred embodiment,

In certain kinds of timer systems, such as those used for starting or cranking a combustion motor, diesel engine and the like, it is highly desirable to be able to controllably adjust the timer so that its value can be preset to any one of continuous settings, as distinguished from stepped or spaced settings. For example, it may be desired to vary the length of the on time from a lower limit of say 5 seconds to an upper limit of 30 seconds; and also to vary the length of the off time independently of the on time. It is also desirable to shut the system down after a pre-set number of repeated on and off cycles, and to be able to effect such shut-down independently of the duration chosen for the on and off periods. In addition it is also desirable that such a system work efficiently from a prime power source such as a battery which may have any standard voltage, for example of 7 volts to 28 volts D.C. This enables the system to be used with standard automotive batteries of for example 12 volts or 24 volts while allowing a high tolerance on the 24 volt supply and a relatively low tolerance on the lower or 12 volt supply. This insures reliable operation over the life span of the battery and also efficient operation during the transient current condition of the start cycle which, as is well known, decreases the supply voltage tremendously. Additionally, it is desirable that the timer system operate correctly over a wide range of ambient temperatures, for example 0° F. to 130° F.

The above noted results and advantages are achieved according to the invention by using an electronic system of components represented by solid state transducer elements such as transistors, diodes and controllable contact rectifiers, thus avoiding the wear and tear and limited mechanical life of rotatable or shiftable devices commonly employed in automotive timers and the like.

Figure 1:
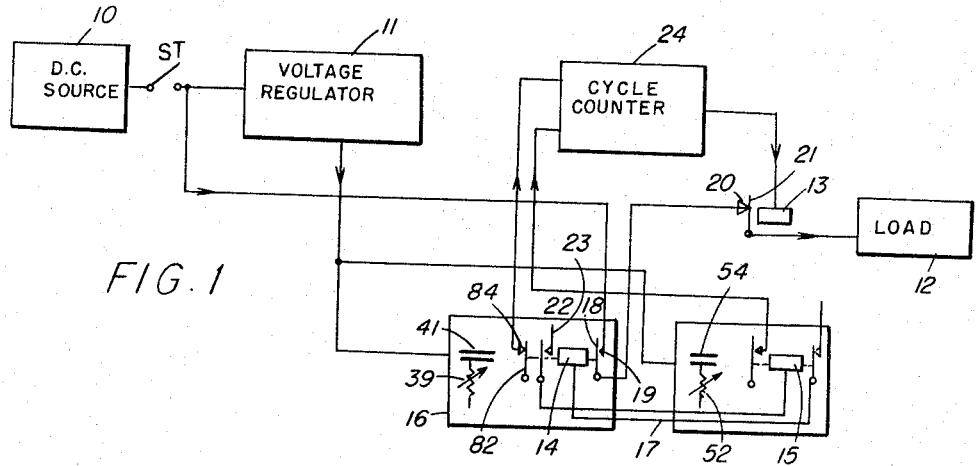
FIG. 1 is a schematic block diagram of a load control system embodying the invention.

Referring to FIG. 1 of the drawing, a description will now be given of a typical system according to the invention. The block 10 represents any usual source of direct current power such for example as a 12-volt battery which is connected to a novel voltage regulator 11 of the solid state transducer kind. The source 10 is arranged to be connected and disconnected from the load 12 by means of a set of relays 13 and 14. The relay 14 forms part of an "on" timer unit 16 and the relay 15 forms part of a similar "off" timer unit 17. Each of these timer units has independently and manually pre-settable elements whereby they can be independently set to any one of a series of continuous timed delays. The load device 12 which may be, for example, a starting motor for a combustion-type engine, is connected to the source 10 by closing switch ST, through normally closed contacts 18, 19 of relay 14, and normally closed contacts 20, 21 of relay 13. After a predetermined interval controlled by the time delay in unit 16, relay 14 is operated and in operating it disconnects the source 10 from the load 12. When relay 14 operates it also activates an operating circuit for relay 15. This circuit is controlled by the adjustable delay circuit in the off timer 17. At the end of the selected off interval, when relay 15 operates through the now closed contacts 22, 23 of relay 14, it breaks the operating circuit for relay 14 which at its now opened contacts 18, 19 closes the circuit through the normally closed contacts 20, 21 of relay 13. Thereby the source 10 is connected to the load 12. With relays 14 and 15 now in their normal condition, the system is in readiness to start another on cycle as hereinabove described. These sequences of events or repeated cycles will continue until the entire system is shut down under control of a cycle counter 24. When the relay 15 operated for the first time at the end of the first off period, it closes a circuit which transmits a starting pulse to the counter 24. This starts the counter 24 counting the pulse at the end of each cycle so that each such pulse will successively turn on the next stage in the counter 24 which may be of any well known ring-counter kind. When the system has completed the predetermined number of repetitive cycles, a signal is received from the counter 24 to operate relay 13. Relay 13 remains in its operated condition, thus shutting down the load 12 permanently until such time as the manual start switch ST is turned off. At the same time relay 13 in its operated condition prevents the two timing circuits 16 and 17 from working and dissipating unnecessary power. The counter 24 can be designed so that it may be set to count any desired number of cycles, for example from 1–6.

DETAILED DESCRIPTION

Figure 3:
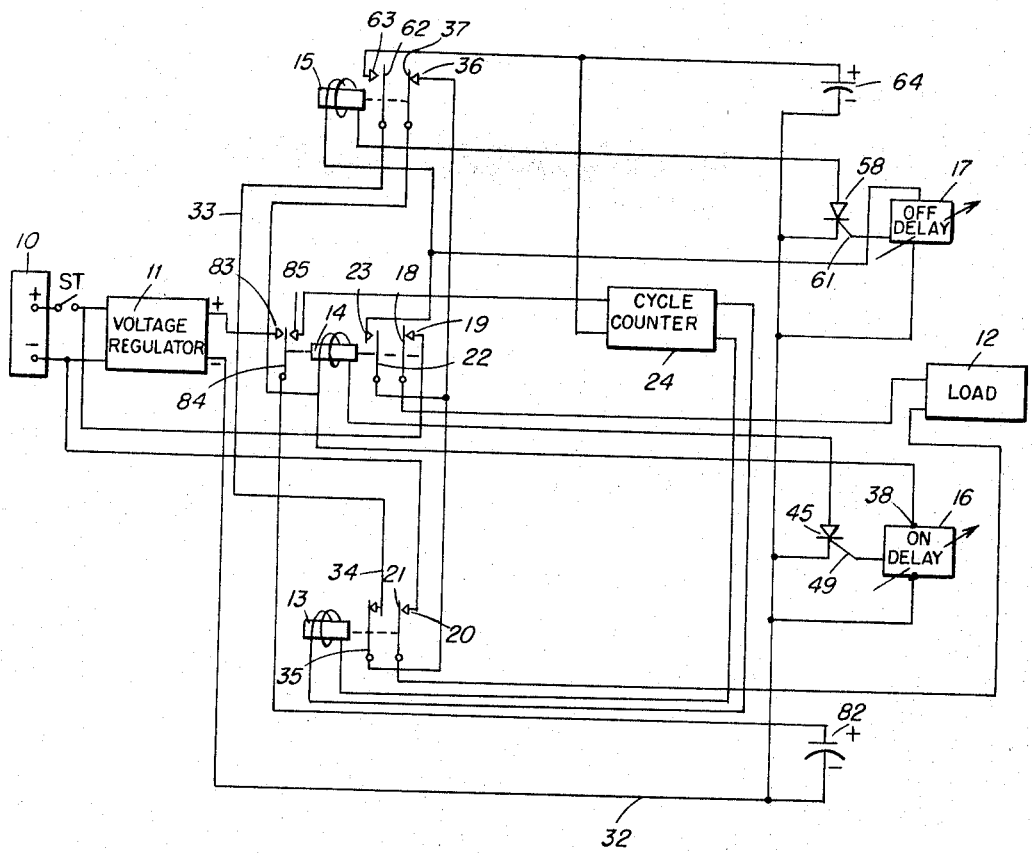
FIG. 3 is a detailed schematic wiring diagram similar to that of FIG. 2 but showing the various relays and their contacts in associated form, whereas in FIG. 2 they are shown in so-called distributed form.
Figure 2:
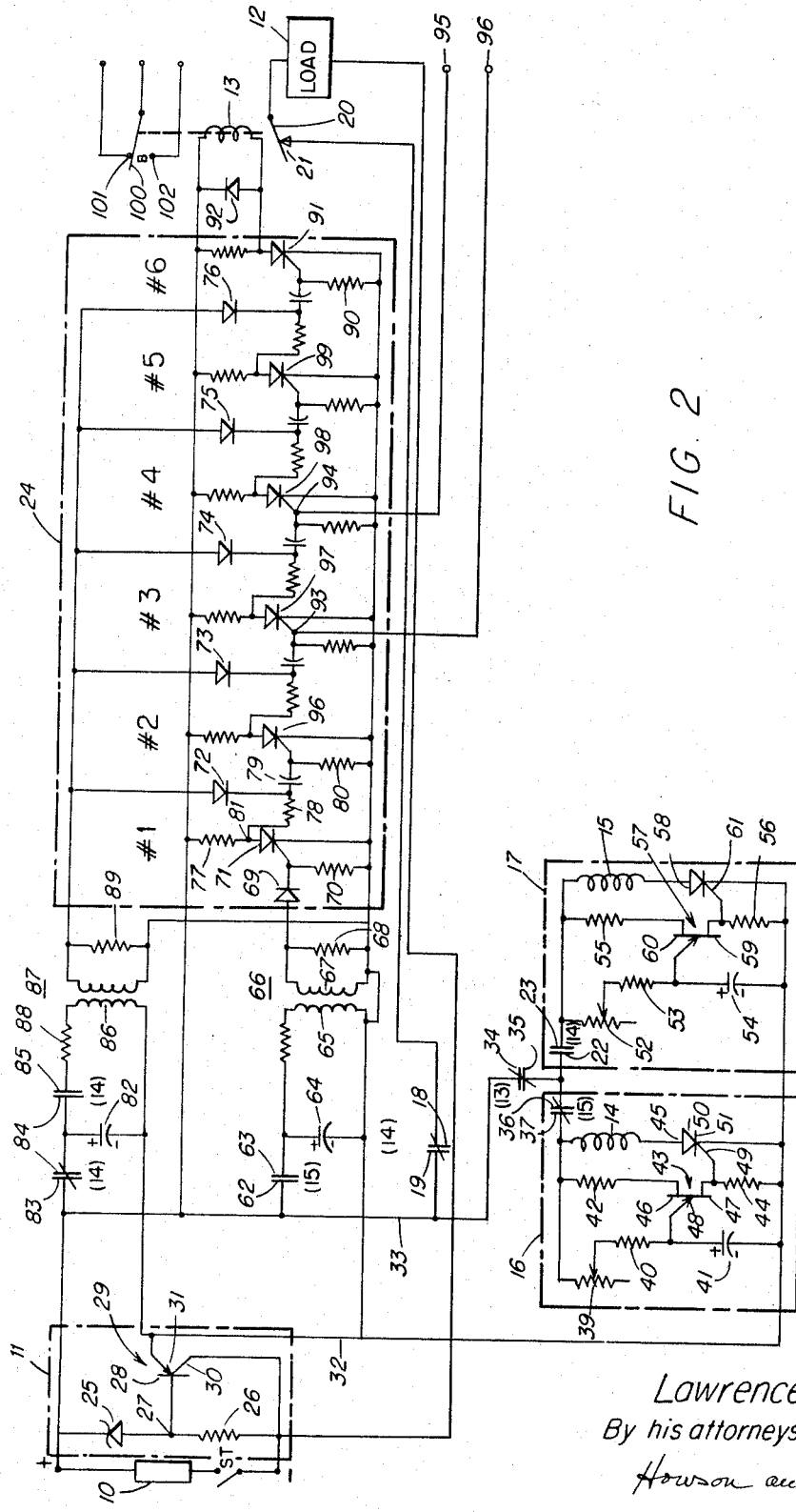
FIG. 2 is a detailed schematic wiring diagram of the system of FIG. 1.

Referring to FIGS. 2 and 3, and more particularly to FIG. 2, a description will now be given of the sequence of operations, it being understood that the parts of FIGS. 2 and 3 which are the same as those of FIG. 1 bear the same designation numerals. The voltage input from source 10 can have a value of for example 7 volts to 28 volts D.C., voltage regulator 11 is designed to regulate at a voltage of a little less than 6.8 volts. This is accomplished by a novel voltage regulating circuit comprising the combination of a Zener diode 25 in series with a resistor 26 and whose common point 27 is connected to the base 28 of a power transistor 29 which is connected to act in an emitter-follower configuration, the collector 30 being connected to the negative terminal of the source 10 and its emitter 31 being connected over conductor 32 to the ring counter 24 and to the timer units 16, 17. The regulated supply at emitter 31 assumes a constant voltage value minus the voltage drop from the base 28 to the emitter 31. It will be understood that the Zener diode 29 is chosen so that no matter what the voltage of source 10 is, between 7 and 28 volts, the Zener diode produces a regulated voltage whose magnitude is a little under 6.8 volts across conductors 32 and 33. Using only one Zener diode, the voltage between conductors 32 and 33 will be a little under 6.8 volts, even when the supply is at 7 volts D.C. or up to 28 volts D.C. While it has been proposed heretofore to employ the so-called avalanching effect of a Zener diode in series with a resistor for voltage regulation purposes, I have found that by including in this combination a power transistor connected as shown in the drawing, certain specific advantages are obtained. One of these advantages is especially desirable where the source 10 is in the form of a battery since the power dissipation is the Zener diode 25 and the resistor 26. This combination is more efficient than the conventional Zener diode and series resistor because the shunt current required is lower, and the dissipation loss of the power transistor is a function of the voltage across it and the load current through it. Therefore the dissipation loss is related to the load. In FIG. 2 normally closed contacts of a relay are represented by parallel lines with a transverse line, and normally open contacts of a relay are represented by parallel lines in accordance with the standard conventions, the relay being identified by the associated parenthetical number.

The positive side of the above mentioned D.C. regulated voltage is connected over conductor 33 and thence through the normally closed contacts 34, 35 of relay 13 and thence through the normally closed contacts 36, 37 of relay 15 and thence to one terminal of the winding of relay 14 and also to one terminal of the delay unit 16. The other terminal of the delay unit 16 is connected to the conductor 32 leading to the negative terminal of the regulated supply. The time delay unit 16 consists of a manually adjustable potentiometer 39, resistor 40, capacitor 41, resistor 42, unijunction transistor 43, resistor 44, switching control or gated rectifier 45, and thence through the winding of relay 14. The time delay is controlled by the setting of the potentiometer 39 which, if desired, can be calibrated in appropriate time units. In one particular system that was found to operate satisfactorily, the potentiometer 39 could be adjusted to provide a delay of from 5 seconds to 30 seconds. It will be understood, of course, that other timing ranges can be provided by suitable choice of the various elements of the timing circuit.

When the capacitor 41 is charged up to a voltage which is approximately half of the voltage between base 46 and base 47 of the unijunction transistor 43, the junction between emitter 48 and the base 47 will break down causing that junction to change from its normal high impedance to a low impedance. Thus the charge on capacitor 41 flows through resistor 44 and applies a corresponding pulse at the gate electrode 49 of the rectifier 45. In the manner well known in such a controlled rectifier the normal high impedance between the anode 50 and the cathode 51 is broken down to a low impedance so that the rectifier 45 acts in the nature of a switch thus completing an energizing path from the positive conductor 33 through the winding of relay 14 and thence through rectifier 45 to the negative conductor 32.

When relay 14 operates, it closes its normally open contacts 22, 23 and connects the positive conductor 33 to one terminal of the delay unit 17, the other terminal of which is connected to negative conductor 32. The delay unit 17 like the unit 16 includes a manually settable potentiometer 52, a resistor 53, a capacitor 54, resistors 55, 56, unijunction transistor 57, as well as the switching control or gated rectifier 58 and the winding of relay 15. After a time interval determined by the setting of potentiometer 52, and the value of the remaining elements, when the capacitor 54 is charged up to a voltage which is approximately half of the voltage between base 59 and base 60, the junction between the emitter and base 59 will break down and greatly reduce its impedance, thus applying by means of resistor 56 a gating pulse at the gating electrode 61 of rectifier 58. This causes relay 15 to operate. The operation of relay 15 breaks the energizing circuit for relay 14 at contacts 36 and 37. Relay 14 thereupon releases and in doing so it breaks the operating circuit for relay 15 at contacts 22, 23. Thus relays 14 and 15 are both restored to normal and the timer is in condition to start another on and off cycle as hereinabove described.

The timer will continue to repeat the on and off cycles until it is shut down at the end of a predetermined number of such cycles. When relay 15 operated for the first time as above described at the end of the first cycle, it connected the positive conductor 33 and the negative conductor 32 through its contacts 62, 63 across capacitor 64 charging that capacitor and creating a pulse through the primary winding 65 of pulse transformer 66. The secondary 67 therefore develops a control pulse across resistor 68 which is connected in circuit with diode 69 whereby only the positive portions of the pulse are developed across the resistor 70 so as to trigger the switching or gated rectifier 71 which forms that first stage of a plural stage ring counter. While the drawing shows a ring counter of six such stages, it will be understood that it may be constituted a greater or less number of such stages. When the rectifier 71 is triggered on it corresponds to the "set" condition of the counter so that when succeeding pulses are applied through transformer 87 the stages are switched on successively in turn. It should be observed that until rectifier 71 is first switched on, the diodes 72, 73, 74, 75, 76 of the respective counter stages are back-biased so that the cathodes of all these diodes take on approximately the voltage of conductor 33. This results from the fact that before rectifier 71 is triggered on, the only voltage drop across resistor 77 results from the leakage current developed across that resistor by the current leaking through rectifier 71 which is for all practical purposes negligible, and also any leakage current through the divider comprised of the resistor 77, resistor 78 through capacitor 79 and resistor 80.

After the first stage of the counter is triggered on, as above described, the voltage at the point 81 approaches the negative regulated voltage at conductor 32 so that a voltage pulse that is greater than the forward voltage drop across any of the diodes 71, etc. can trigger on the next succeeding counter stage. It should be observed that each diode 72, 73, etc. in a counter stage has its back-bais removed through the medium of the control rectifier such as rectifier 71 in the stage immediately ahead.

Thus for each cycle of on and off connection of the load the counter is advanced one stage at a time. After the start switch ST is operated the capacitor 82 is charged immediately through the normally closed contacts 83, 84 of relay 14, consequently, when that relay operates as hereinabove described at the end of each on period, it transfers the charge on capacitor 82 through its normally open contacts 84, 85 into the primary winding 86 of pulse transformer 87 through series resistor 88. A corresponding pulse is developed across the resistor 89. This pulse, however, does nothing at this time because all of the diodes 72–76 leading from the transformer 87 are still in the back-biased condition. When relay 15 first becomes energized at the end of the first off period as hereinabove described, contacts 62, 63 close, thus starting a "set" condition as described, causing first stage rectifier 71 to be triggered to the conduction state.

At the end of the second on period relay 14 is again operated and opens its normally closed contacts 83, 84 and closes the contacts 84, 85. This time the pulse which is developed across the resistor 89 causes a pulse to pass through diode 72 so as to trigger on the second stage of the counter because now the switching rectifier 71 is conductive having been rendered so by the closure of contacts 62, 63 of relay 15 when that relay operated for the first time at the end of the first cycle. This process is repeated so that at the end of every on period a pulse is generated to trigger on the successive stages in the ring counter 24.

At the end of the sixth on period finally a pulse is conducted through diode 76 to develop a corresponding voltage across resistor 90 to trigger on the switching rectifier 91 of the final stage of the ring counter, thereby energizing the relay 13. As a result, the normally closed contacts 20, 21 of that relay are opened thus permanently disconnecting the load 12 from the source 10 until such time as the energizing switch ST is turned off. Until that time rectifier 91 continues conductive and thus relay 13 is maintained energized. At the same time the normally closed contacts 34 and 35 of relay 13 open, thus preventing the two timing units 16 and 17 from working and dissipating unnecessary power.

If it is desired to shut down the counter 24 at any lower count, for example, at count #5, the points 93 and 94 between the third and fourth stages for example can be short-circuited at the terminals 95, 96. When so shorted, the counter 24 will shut down permanently at the end of five complete cycles instead of six. Similarly and any all of the gated rectifiers can have respective conductors (not shown) brought out for short-circuiting depending upon the number of cycles that are to be counted.

From the foregoing it will be seen that the ring counter which finally determines the de-energizing of the load disconnecting relay 13 is determined only by the number of cycles and not by the length of the on and off periods of those cycles. Thus it is possible to achieve variable on and off periods without the necessity of using a third timer to shut the system down at the end of a selected number of cycles. The use of such a third timer is undesirable especially in the field because temperature and voltage variations tend to upset the repeatability in such a three timer system and it would be necessary to set the third timer midway between the off period of the cycle for the mean condition of temperature and voltage.

One actual system that was found to produce the desired results was run for test purposes at 0° F. to 130° F and at room temperature. The on period for each cycle was set for approximately twelve seconds, the off period for approximately twelve seconds and the counter was set to shut off the system at the end of four cycles. The voltage source was set at the low limit of 7 volts D.C. as well as at a high limit of 28 volts D.C. and zero temperature as well as other increments up to 130° F.

While the invention is not limited to any particular type of components constituting the various solid state transducer elements, a system found to produce the desired results employed the following types.

| Element No.: | Description |
| --- | --- |
| 25 | Zener diode. |
| 28 | Power transistor type. |
| 43, 57 | Unijunction transistor type. |
| 69 | Crystal diode type. |
| 72–76 | Crystal diodes type. |
| 69, 71, 91, 92, 96, 97, 98, 99, 45, 58 | Silicon control rectifiers. |

FIG. 3 is a translation of the circuit of FIG. 2 to show the various relays in associated contact form as distinguished from distributed contact form. The operation of the system of FIG. 3 is identical with that of FIG. 2 and further detailed description thereof is not deemed necessary.

Various changes and modifications may be made in the disclosed embodiment without departing from the scope of the invention. Thus while one particular form of ring counter is described, any other well known electronic ring counter may be employed. Furthermore, while FIG. 3 shows the system with the positive and negative terminals of the source 10 connected by individual conductors to the respective parts of the system, it will be understood that either one of the said terminals can be grounded and the return circuits for the various elements may also be grounded. In other words, a conventional ground return system may be employed. For practical purposes, therefore the load 12 should be connected through the contacts 18, 19, 20 and 21 externally of the package so that if one terminal of the load is grounded and one terminal of the source 10 is grounded, the proper connections between the source 10 and the load 12 are readily made depending upon which terminal of the source 10 is grounded. Also, if desired, relay 13 may be provided with an additional set of contacts 100, 101, 102. Contacts 100 and 101 are normally closed and may be used to perform some other function, such for example as shorting a low pressure oil switch (not shown) and the contacts 100 and 102 when closed may be used to control a suitable alarm system (not shown).

What is claimed is:

1. A timer system comprising in combination, input terminals for connection to a source of electric power, output terminals for connection to a load to be energized from said source, switch means for cyclically connecting and disconnecting said source and load, the last mentioned means comprising a first time delay unit for controlling the on period of said connection in each cycle, a second time delay unit for controlling the off period of said connection during each cycle, a cycle counter, circuit means connecting said timers to said counter to count said cycles, and circuit means effective when a predetermined number of cycles have been counted for permanently disconnecting said source from said load.

2. A timer system according to claim 1 in which each of said timer units has an independently adjustable element whereby the duration of the on periods can be controlled independently of the off periods.

3. A timer system according to claim 2 in which circuit means are provided for controlling the number of cycles before said permanent disconnection and independently of the length of the on periods and the off periods.

4. A timer system according to claim 1 in which each of said timer units includes a respective manually adjustable time delay network for controlling the duration of the on and off periods independently of each other and also independently of the number of cycles to be counted before said permanent disconnection.

5. A timer system according to claim 1 in which said switch means includes a set of three relays, circuit connections for controlling the first relay by the on timer, circuit connections for controlling the second relay by the off timer, and other circuit connections between said counter and said relays to cause said third relay to respond and permanently disconnect said source from said load.

6. A timer system according to claim 5 in which the first relay has an energizing circuit controlled by the time delay unit for the on periods and by normally closed contacts of the second relay, the second relay having an energizing circuit controlled by the delay unit for the off periods and by normally open contacts of the first relay, and said energizing circuits of the first and second relays are closed through normally closed contacts of said third relay.

7. A timer system according to claim 5 in which the first and second relays have their energizing circuits connected to said source through a solid state transducer switch of the gated on and off kind, and circuit connections are provided between each time delay unit and its associated switch to close said switch after a predetermined time interval determined by the associated time delay unit.

8. A timer system according to claim 7 in which means are provided to apply a gating on voltage to each transducer switch and including an off voltage storage capacitor and a transistor which transistor is normally of high impedance and is switched to low impedance under control of the voltage stored in said capacitor when it reaches a predetermined level.

9. A timer system comprising in combination a source of direct current voltage, a load device to be energized from said source, control means for cyclically connecting and disconnecting said source and load, a voltage regulator supplied from said source for applying precisely regulated voltage to said control means, said control means including a ring counter, a first time delay unit, a second time delay unit, each of said time delay units including a voltage storing capacitor and a gated rectifier, and relay switch means controlled jointly by both said delay units and said ring counter for automatically determining the duration of each cycle of on and off connections between said suorce and load and for automatically and permanently disconnecting the source and load after a predetermined number of cycles.

10. A timer system according to claim 9 in which said source has a voltage which can be of any value correlated with the load requirements, and said regulator is connected to said source to apply to said control means a fixed control voltage.

11. A timer system as in claim 1 further comprising a voltage regulator including in series across said input terminals a voltage divider consisting of a resistor and a diode of the avalanching current kind, and a transistor having its base connected to the junction point between said diode and resistor, one of the remaining electrodes of said transistor being connected through said base in shunt to said resistor and thence to one terminal of said source and the other of the remaining electrodes of the transistor being connected to said control device and thence to the other terminal of said source.

12. A voltage regulator according to claim 11 in which said transistor is connected to said control device in an emitter-follower configuration.

No references cited.

ORIS L. RADER, *Primary Examiner.*

T. B. JOIKE, *Assistant Examiner.*